United States Patent
Chen et al.

(10) Patent No.: US 10,717,917 B2
(45) Date of Patent: Jul. 21, 2020

(54) METHOD AND COMPOSITION FOR ASPHALTENE DISPERSION

(71) Applicant: Croda, Inc., Edison, NJ (US)

(72) Inventors: Xin Chen, Hockessin, DE (US); Min Ma Wang, Kennett Square, PA (US); Craig Michael Sungail, Chadds Ford, PA (US); Zhongqi Shen, Plainsboro, NJ (US)

(73) Assignee: Croda, Inc., Edison, NJ (US)

( * ) Notice: Subject to any disclaimer, the term of this patent is extended or adjusted under 35 U.S.C. 154(b) by 0 days.

(21) Appl. No.: 16/309,537

(22) PCT Filed: Jun. 20, 2017

(86) PCT No.: PCT/US2017/038238
§ 371 (c)(1),
(2) Date: Dec. 13, 2018

(87) PCT Pub. No.: WO2017/223028
PCT Pub. Date: Dec. 28, 2017

(65) Prior Publication Data
US 2019/0330514 A1    Oct. 31, 2019

Related U.S. Application Data

(60) Provisional application No. 62/354,314, filed on Jun. 24, 2016.

(51) Int. Cl.
*C09K 8/524* (2006.01)
*E21B 37/06* (2006.01)
*E21B 21/06* (2006.01)
*C10L 1/19* (2006.01)
*C10L 10/18* (2006.01)

(52) U.S. Cl.
CPC ............ *C09K 8/524* (2013.01); *C10L 1/1905* (2013.01); *C10L 10/18* (2013.01)

(58) Field of Classification Search
CPC .......... C09K 8/524; C09K 8/64; C09K 8/665; C09K 8/70; C09K 8/82; C09K 8/845; C09K 8/92; C09K 8/035; E21B 37/06; E21B 43/2405; E21B 43/26; E21B 43/267; E21B 21/068; E21B 43/16
See application file for complete search history.

(56) References Cited

U.S. PATENT DOCUMENTS

| | | |
|---|---|---|
| 2,893,990 A | 7/1959 | Hass et al. |
| 4,256,605 A | 3/1981 | Baker et al. |
| 4,414,035 A | 11/1983 | Newberry et al. |
| 4,708,753 A | 11/1987 | Forsberg |
| 4,786,681 A | 11/1988 | Baker et al. |
| 4,876,018 A | 10/1989 | Karydas |
| 5,925,233 A | 7/1999 | Miller et al. |
| 6,063,146 A | 5/2000 | Miller et al. |
| 6,313,367 B1 | 11/2001 | Breen |
| 6,383,237 B1 | 5/2002 | Langer et al. |
| 6,402,934 B1 | 6/2002 | Chheda et al. |
| 6,478,904 B1 | 11/2002 | Venter et al. |
| 6,946,524 B2 | 9/2005 | Breuer et al. |
| 7,674,365 B2 | 3/2010 | Banavali et al. |
| 7,795,183 B2 | 9/2010 | Wilkes et al. |
| 7,833,407 B2 | 11/2010 | Brons et al. |
| 8,177,960 B2 | 5/2012 | Rouet et al. |
| 8,342,198 B2 | 1/2013 | Asomaning et al. |
| 8,425,761 B2 | 4/2013 | Wright et al. |
| 8,450,249 B2 | 5/2013 | Milligan et al. |
| 8,450,250 B2 | 5/2013 | Milligan et al. |
| 8,450,251 B2 | 5/2013 | Milligan et al. |
| 2006/0223945 A1 | 10/2006 | Hollingshurst et al. |
| 2010/0147739 A1 | 6/2010 | Levine et al. |
| 2011/0092393 A1 | 4/2011 | Faust et al. |
| 2012/0004344 A1 | 1/2012 | Burden |
| 2012/0220807 A1 | 8/2012 | Miller et al. |
| 2012/0241390 A1 | 9/2012 | Hassan et al. |
| 2014/0005031 A1* | 1/2014 | Chaumonnot ......... B01J 27/186 502/64 |
| 2014/0338254 A1 | 11/2014 | Feustel et al. |
| 2015/0080273 A1* | 3/2015 | Hatchman .......... B01D 19/0404 507/219 |
| 2015/0166876 A1* | 6/2015 | Labarre ................ C08F 22/385 507/225 |
| 2017/0044421 A1* | 2/2017 | Parvulescu ............. C09K 8/58 |

FOREIGN PATENT DOCUMENTS

| | | |
|---|---|---|
| CA | 2298880 A1 | 8/2000 |
| EP | 1357171 A2 | 10/2003 |
| EP | 1357172 A2 | 10/2003 |
| EP | 1359206 A1 | 11/2003 |
| JP | 2000295963 A | 10/2000 |
| WO | 2008074983 A1 | 6/2008 |
| WO | 2014123736 A2 | 8/2014 |
| WO | 2016053634 A1 | 4/2016 |

OTHER PUBLICATIONS

International Search Report and Written Opinion for International Application No. PCT/US2017/038238, dated Sep. 12, 2017—11 pages.

* cited by examiner

*Primary Examiner* — Zakiya W Bates
(74) *Attorney, Agent, or Firm* — RatnerPrestia

(57) ABSTRACT

Provided is a method of dispersing asphaltenes to inhibit asphaltene precipitation and/or deposition in a hydrocarbon. The method includes adding to the hydrocarbon an asphaltene dispersing agent which is an ester of a mono-carboxylic fatty acid and a sugar. The sugar has at least 4 hydroxyl groups. In addition, more than one of the hydroxyl groups on the sugar are reacted with the mono-carboxylic fatty acid to form the ester.

8 Claims, No Drawings

METHOD AND COMPOSITION FOR ASPHALTENE DISPERSION

CROSS REFERENCE TO RELATED APPLICATIONS

This application is the National Stage filing of International Appln. No. PCT/US2017/038238, filed Jun. 20, 2017, and claims priority of US' Provisional Patent Application Ser. No. 62/354,314, filed Jun. 24, 2016, the entirety of which applications is incorporated herein by reference for all purposes.

FIELD OF INVENTION

The present invention relates to a method of inhibiting asphaltene precipitation and/or deposition in a hydrocarbon by adding an asphaltene dispersing agent to the hydrocarbon, to a composition comprising a diluent medium and the asphaltene dispersing agent, to a crude oil or derivative comprising the asphaltene dispersing agent and to the use of an ester reaction product to disperse asphaltene in a hydrocarbon. An example of a suitable hydrocarbon is crude oil.

BACKGROUND

Asphaltenes are present in crude oils. Asphaltenes include a large number of structures, such as high molecular weight fused aromatic compounds with heteroatoms. Asphaltenes are heterocyclic unsaturated macromolecules primarily of carbon and hydrogen, but also containing minor components such as sulphur, oxygen, nitrogen, and various heavy metals. Due to the complexity of their chemistry, asphaltenes can be defined as the fraction of crude oil which is insoluble in heptane.

In crude oil, asphaltenes are usually present as a colloidal dispersion which is stabilised by oil resins. Under normal reservoir conditions, asphaltenes are in equilibrium in the crude oil. As crude oil is produced, the equilibrium may be altered by a number of factors, such as carbon dioxide injection, pH change, pressure change, temperature change, shear or streaming potential through porous media resulting in asphaltene flocculation or precipitation, and asphaltene deposition onto surfaces.

Asphaltene precipitation and/or deposition can occur anywhere in the crude oil production life cycle from the reservoir to the refinery. For example, asphaltene deposition may occur in the near-wellbore region including perforations, in the tubing, downhole and surface chokes, and surface flowlines. Predicting where asphaltene deposition might occur requires an understanding of the mechanisms for asphaltene deposition. The main causes are pressure decrease and injection of incompatible fluids in the reservoir rocks. Asphaltene deposition can significantly reduce well productivity, causing operational problems during production and processing of crude oils, damaging formations, and decreasing production.

Asphaltenes may also precipitate out and deposit during production, refining, transportation and storage of any products derived from crude oil, e.g. heavy heating oil or marine oil.

Heavy oils, which are often used for powering ships, comprise considerable amounts of asphaltenes. Precipitating out of asphaltenes can lead both to poor combustion and to difficulties during handling and storage of the fuel. Combustion disturbances due to precipitating out of asphaltenes are also observed in power stations operated with heavy oils.

Some oils comprise hydrocarbon waxes which precipitate out at low temperatures. Interactions between the precipitating out of wax and asphaltenes can increase the total amount of substance precipitated out and/or the rate of formation thereof.

Asphaltenes can be deposited in valves, pipes and other process equipment, for example in an oil refinery. On hot surfaces, for example heat exchangers, carbonization of these deposits can make their removal very difficult. The deposits reduce the efficiency of process equipment and in the worst case scenario can result in a complete blockage and stop in production, which results in high costs.

Asphaltene deposits can be removed by using solvents such as xylene or xylene mixtures which typically have undesirable health, safety, and environmental concerns. In general, prevention of asphaltene precipitation is more effective than attempting the removal of the precipitates or deposits. Precipitating out of asphaltenes can be reduced by adding a dispersing agent to the oil. If precipitates of asphaltenes have already formed, the addition of a dispersing agent can improve the effectiveness of any solvents used to remove the deposits.

Currently, several major chemical classes of asphaltene dispersants are commercially available and used in the oil industry. Examples of patent specifications describing the use of different asphaltene dispersants include:

U.S. Pat. No. 4,414,035 discloses the use of dodecylbenzene sulfonic acid (DDBSA) as an asphaltene dispersant. DDBSA is widely used in the industry for its effectiveness and low cost. However, there are environmental concerns about the use of DDBSA.

U.S. Pat. No. 5,925,233 describes the use of alkanesulfonic acid as an asphaltene dispersant. It can be used alone, or in formulation with alkyl-formaldehyde resin, oxyalkylated amines, or wax-dispersing agents.

U.S. Pat. No. 6,313,367 describes the use of esters derived from polyhydric alcohols and carboxylic acids (such as sorbitan mono-oleates) as asphaltene dispersants.

US2011/0092393 discloses the use of hydrophobically modified non-ionic polysaccharides as viscosity reducers in petroleum applications, such as recovery and transport of heavy petroleum oils. The polysaccharides are modified with, for sample, hydrophobically end-capped 2-hydroxyethyl groups.

US2012/0220807 describes polymer asphaltene dispersants derived from the polymerisation of α-olefin and vinyl pyrrolidinone.

US2012/0004344 discloses the use of acrylate copolymers of 2-ethylhexyl methacrylate and n-butyl acrylate as an asphaltene drag reducing additive for crude oil.

WO2016/053634 describes asphaltene dispersants derived from the reaction product of an alk(en)yl substituted succinic anhydride such as polyisobutylene succinic anhydride (PIBSA) and a polyol.

Despite the wide number of materials disclosed as having asphaltene dispersancy properties, there is still a need for environmentally-friendly asphaltene dispersants for crude oil which have improved properties over existing materials such as reducing (i) the amount of asphaltene precipitate formed, (ii) the speed of precipitate formation, (iii) the particle size of the precipitate, (iv) the tendency of the precipitate to be deposited on surfaces, and/or (v) the amount of asphaltene dispersant required to be effective.

SUMMARY OF THE INVENTION

We have surprisingly discovered asphaltene dispersants and method of use thereof which address or significantly reduce at least one of the aforementioned or other problems.

Thus viewed from a first aspect, the present invention provides a method of dispersing asphaltenes to inhibit asphaltene precipitation and/or deposition in a hydrocarbon, the method comprising adding to the hydrocarbon an asphaltene dispersing agent which is an ester of a mono-carboxylic fatty acid and a sugar;

wherein the sugar comprises at least 4 hydroxyl groups; and wherein more than one of the hydroxyl groups on the sugar are reacted with the mono-carboxylic fatty acid to form the ester.

Viewed from a second aspect, the present invention provides a composition comprising a diluent medium and an asphaltene dispersing agent according to the first aspect of the invention.

Viewed from a third aspect, the present invention provides crude oil or a product derived therefrom comprising asphaltenes and an asphaltene dispersing agent according to the first aspect of the invention.

Viewed from a fourth aspect, the present invention provides the use of an ester of a fatty acid and a sugar, wherein the sugar comprises at least 4 hydroxyl groups and wherein more than one of the hydroxyl groups on the sugar are reacted with the fatty acid to form the ester, to disperse an asphaltene in a hydrocarbon. The ester may be an asphaltene dispersing agent according to the first aspect of the invention.

Any aspect of the invention may include any of the features described herein with regard to that aspect of the invention or any other aspects of the invention.

DETAILED DESCRIPTION OF THE INVENTION

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

Many of the chemicals which may be used to produce the composition of the present invention are obtained from natural sources. Such chemicals typically include a mixture of chemical species due to their natural origin. Due to the presence of such mixtures, various parameters defined herein can be an average value and may be non-integral.

Sugar

A sugar is a reactant used in making the asphaltene dispersing agent of the present invention.

The sugar may comprise at least 4 carbon atoms, preferably at least 7, particularly at least 10. The sugar may comprise at most 20 carbon atoms, preferably at most 18, particularly at most 16. The sugar suitably comprises in the range from 4 to 25, more preferably 7 to 20, particularly 8 to 16, and especially about 12 carbon atoms.

The sugar comprises at least 4 hydroxyl groups, preferably at least 5, particularly at least 6, desirably at least 7. The sugar may comprise at most 12 hydroxyl groups, preferably at most 11, particularly at most 10, desirably at most 9.

The sugar may comprise at least 1 primary hydroxyl group, preferably at least 2, particularly at least 3. The sugar may comprise at most 8 primary hydroxyl groups, preferably at most 7, particularly at most 6.

The sugar may comprise at least 1 secondary hydroxyl group, preferably at least 2, particularly at least 3, desirably at least 4. The sugar may comprise at most 8 secondary hydroxyl groups, preferably at most 7, particularly at most 6.

The sugar may be a monosaccharide, disaccharide, trisaccharide, tetrasaccharide and/or oligo- or polysaccharide. Preferably the sugar is not a sugar alcohol or a sugar alcohol derivative, particularly the sugar is not sorbitol or sorbitan. Preferably the asphaltene dispersing agent does not comprises a sugar alcohol or a sugar alcohol derivative, particularly not sorbitol or sorbitan.

Suitable monosaccharides include glucose, fructose and galactose. Suitable disaccharides include sucrose, maltose, lactose, cellobiose, trehalose and lactulose.

The sugar preferably comprises, consists essentially of, or consists of a monosaccharide and/or disaccharide, more preferably a disaccharide, and particularly sucrose. Preferably, the sugar is a disaccharide, particularly sucrose.

Fatty Acid

A fatty acid is a reactant used in making the asphaltene dispersing agent of the present invention. The fatty acid is a mono-carboxylic acid. The fatty acid may comprise an alkyl group attached to a carboxylic group.

The fatty acid may be linear or branched. The fatty acid may be saturated or unsaturated. If the fatty acid is saturated then preferably it is branched. Unsaturated fatty acids are preferred. The unsaturated fatty acids may be mono-unsaturated (with 1 C=C double bond) or poly-unsaturated (with multiple C=C double bonds). The fatty acid may be unsaturated and/or branched. Preferably, the fatty acid is poly-unsaturated and/or branched.

The fatty acid suitably has at least 6 carbon atoms, preferably at least 10 carbon atoms, more preferably at least 12 carbon atoms, particularly at least 14 carbon atoms, and especially at least 16 carbon atoms. The fatty acid preferably has at most 24 carbon atoms, more preferably at most 22 carbon atoms, and particularly at most 20 carbon atoms. Preferably the fatty acid has in the range from 6 to 24, more preferably 14 to 22, and particularly 16 to 20 carbon atoms.

Suitable saturated fatty acids may be selected from the group consisting of hexanoic (caproic), octanoic (caprylic), nonanoic, decanoic (capric), undecanoic, dodecanoic (lauric), tridecanoic, tetradecanoic (myristic), 2-ethyl hexanoic, trimethylhexanoic, trimethylnonanoic, hexadecanoic (palmitic), octadecanoic (stearic), isostearic, decadecanoic, acids and mixtures thereof. Preferred saturated fatty acids may be selected from lauric, stearic, isostearic acids and mixtures thereof, particularly isostearic acid.

Suitable unsaturated fatty acids may be selected from the group consisting of oleic, ricinoleic, linoleic, linolenic, acids and mixtures thereof. The unsaturated fatty acid may be mono-unsaturated. Preferred unsaturated fatty acids are poly-unsaturated acids. Poly-unsaturated acids may be selected from the group consisting of linoleic acid, linolenic acid and mixtures thereof. Linoleic acid is a particularly preferred unsaturated fatty acid.

The fatty acid may comprise at least 10 wt % unsaturated species, preferably at least 20 wt %, particularly at least 30 wt %, desirably at least 40 wt %. The fatty acid may comprise at most 80 wt % unsaturated species, preferably at most 70 wt %, particularly at most 60 wt %.

The fatty acid may comprise at least 10 wt % mono-unsaturated species, preferably at least 20 wt %, particularly at least 30 wt %, desirably at least 40 wt %. The fatty acid may comprise at most 80 wt % mono-unsaturated species, preferably at most 70 wt %, particularly at most 60 wt %.

The fatty acid may comprise at least 10 wt % poly-unsaturated species, preferably at least 20 wt %, particularly at least 30 wt %, desirably at least 40 wt %. The fatty acid may comprise at most 80 wt % poly-unsaturated species, preferably at most 70 wt %, particularly at most 60 wt %.

The fatty acid may comprise at least 10 wt % branched species, preferably at least 20 wt %, particularly at least 30 wt %, desirably at least 40 wt %. The fatty acid may comprise at most 80 wt % branched species, preferably at most 70 wt %, particularly at most 60 wt %.

The fatty acids are preferably mixtures obtained from natural sources, such as, for example, plant or animal esters, particularly triglycerides. Fatty acids derived from plant sources are preferred. Suitable natural sources include those selected from the group consisting of canola oil, castor oil, soybean oil, cottonseed oil, corn oil, tall oil, palm kernel oil, coconut oil, rapeseed oil, high erucic rapeseed oil, tallow oil and mixtures thereof. Preferred fatty acids are soybean and cottonseed fatty acids, particularly soybean fatty acid. Preferably the fatty acid is derived from soybean oil.

The fatty acid reacted to form the asphaltene dispersing agent may be in the form of a fatty acid alkyl ester. The fatty acid alkyl ester may be a C1 to C8 alkyl ester, preferably a C1 to C4 alkyl ester, particularly a methyl ester and/or ethyl ester, desirably a methyl ester.

Asphaltene Dispersing Agent

In the asphaltene dispersing agent of the invention, more than one of the hydroxyl groups on the sugar are reacted with the fatty acid to form the ester.

Preferably at least one of the hydroxyl groups on the sugar remains unreacted in the ester. Preferably on average, at most 75% of the hydroxyl groups on the sugar are reacted with the fatty acid to form the ester.

The molar ratio of fatty acid reacted with sugar to form the asphaltene dispersing agent is suitably in the range from 1.2 to 8:1, preferably 2 to 7:1, more preferably 2 to 6:1, particularly 3 to 5:1, and especially 3.5 to 4.5:1.

The asphaltene dispersing agent is not a mono-ester. The asphaltene dispersing agent is a multi-ester (i.e. it comprises more than one ester group). It has been found that asphaltene dispersing agents according to the invention, wherein more than one of the hydroxyl groups on the sugar are reacted with the acid to form the ester perform better than mono-esters such as sorbitan mono-oleate. Without being bound by theory, it is believed that the multiple fatty acid chains in the ester may improve its asphaltene dispersing properties in various crude oil types.

The asphaltene dispersing agent may comprise on average at least 2 ester groups, preferably at least 2.5, particularly at least 3, desirably at least 3.5. The asphaltene dispersing agent may comprise on average at most 6 ester groups, preferably at most 5.5, particularly at most 5, desirably at most 4.5.

The asphaltene dispersing agent may be a partial ester (e.g. not fully esterified). It has been found that when at least one of the hydroxyl groups on the sugar remains unreacted in the ester, this also improves the performance of the asphaltene dispersing agent. Without being bound by theory, it is believed that this may be due to the residual hydroxyl functionality in the asphaltene dispersing agent.

The asphaltene dispersing agent may be the reaction product of solely a sugar and a fatty acid or a fatty acid alkyl ester.

The asphaltene dispersing agent may not comprise sorbitan as a reactant, preferably the asphaltene dispersing agent does not comprise glycerol, polyglycerol or sorbitan as a reactant, desirably the asphaltene dispersing agent does not comprise glycerol, polyglycerol, sorbitol, sorbitan or isosorbide as a reactant.

Preferably the asphaltene dispersing agent does not comprise a diacid or anhydride as a reactant. Preferably the asphaltene dispersing agent does not comprise a functionalised polyolefin as a reactant. Preferably the asphaltene dispersing agent is not alkoxylated and/or does not comprise an alkylene oxide as a reactant.

The asphaltene dispersing agent preferably has an acid value (measured as described herein) of at most 30 mg KOH/g, more preferably at most 20 mg KOH/g, particularly at most 10 mg KOH/g, and especially at most 5 mg KOH/g. The asphaltene dispersing agent may have an acid value (measured as described herein) of at least 0.01 mg KOH/g, preferably at least 0.05 mg KOH/g, particularly at least 0.1 mg KOH/g.

The asphaltene dispersing agent preferably has a hydroxyl value (measured as described herein) of at most 200 mg KOH/g, more preferably at most 190 mg KOH/g, particularly at most 180 mg KOH/g. The asphaltene dispersing agent may have a hydroxyl value (measured as described herein) of at least 50 mg KOH/g, preferably at least 100 mg KOH/g, particularly at least 120 mg KOH/g.

The asphaltene dispersing agent preferably has a saponification value (measured as described herein) of at most 300 mg KOH/g, more preferably at most 250 mg KOH/g, particularly at most 220 mg KOH/g. The asphaltene dispersing agent may have a saponification value (measured as described herein) of at least 50 mg KOH/g, preferably at least 100 mg KOH/g, particularly at least 120 mg KOH/g.

The asphaltene dispersing agent preferably has an iodine value (measured as described herein) of at most 150 g/100 g, more preferably at most 130 g/100 g, particularly at most 120 g/100 g. The asphaltene dispersing agent may have an iodine value (measured as described herein) of at least 10 g/100 g, preferably at least 20 g/100 g, particularly at least 40 g/100 g.

As used herein, the term 'HLB' means the hydrophilic/lipophilic balance of a molecule. The HLB value of a molecule is a measure of the degree to which it is hydrophilic or lipophilic, determined by calculating values for the different regions of the molecule. An HLB value of 0 corresponds to a completely lipophilic/hydrophobic molecule, and a value of 20 corresponds to a completely hydrophilic/lipophobic molecule.

The HLB value may be measured experimentally by comparison of the solubility behaviour of the composition being tested with the solubility behaviour of standard compositions of known HLB. It may also be calculated theoretically, for example by using Griffin's method as is known in the art.

The asphaltene dispersing agent preferably has an HLB value of at least 0.5, preferably at least 1, particularly at least 2, desirably at least 3. The asphaltene dispersing agent preferably has an HLB value of at most 15, preferably at most 10, particularly at most 8, desirably at most 7. A lower HLB value as defined above may improve the performance of the asphaltene dispersing agent by increasing its compatibility with the hydrocarbon it is added to and/or with the asphaltene.

Process of Making the Asphaltene Dispersing Agent

To make the asphaltene dispersing agent, a dry (or anhydrous) sugar may be used. The sugar may be milled into a fine powder. A powdered emulsifier may be added to the sugar. The fatty acid may be in the form of a methyl ester.

A powdered catalyst may be used. The catalyst may be potassium carbonate (K2CO3).

The reaction may be carried out at less than 160° C., preferably less than 150° C., particularly less than 140° C. The reaction may be carried out at more than 90° C., preferably more than 100° C., particularly more than 110° C. The upper reaction temperature limit may help to prevent the sugar from caramelizing during the reaction.

Hydrocarbon to be Treated

Viewed from one aspect, the invention provides crude oil or a product derived therefrom comprising asphaltene and an effective amount of the asphaltene dispersing agent.

The hydrocarbon, preferably oil, to be treated, by the addition of the asphaltene dispersing agent, for inhibition of asphaltene precipitation and/or deposition can be crude oil or any product derived from crude oil, e.g. heavy heating oil or marine oil. In one embodiment, the crude oil may be treated when at least partially located within an oil well, an oil reservoir and/or at least one component of a crude oil distribution apparatus, such as a pipeline. In a preferred embodiment, the asphaltene dispersing agent is added to a hydrocarbon which is located within an oil refinery. The hydrocarbon to be treated may be located in at least one component of a crude oil refining apparatus. The refining apparatus may be a heat exchanger, a distillation apparatus, a crude unit preheat train, a crude unit side-stream, a crude unit feed to either the vacuum tower or a catalytic cracking unit or a combination thereof. Products derived from crude oil may be treated during production, refining, transportation and/or storage thereof.

The hydrocarbon is suitably an asphaltene-containing oil. The hydrocarbon may comprise, in thermodynamic equilibrium, asphaltenes, maltenes and/or resins. The introduction of the asphaltene dispersing agent into the hydrocarbon can result in maintenance of the thermodynamic equilibrium, thus preventing asphaltene precipitation or deposition, or nearly maintaining thermodynamic equilibrium, such that precipitation or deposition is significantly reduced. The thermodynamic equilibrium may be improved over a wide range of temperatures, including elevated temperatures (e.g. at least 80° C.) which are present in an oil refinery. The hydrocarbon or crude oil may be at a temperature of at least 80° C., preferably at least 100° C., particularly at least 150° C. The method of the invention may include the step of heating the hydrocarbon to at least 80° C., preferably at least 100° C., particularly at least 150° C. The heating step may occur before, during or after the addition of the asphaltene dispersing agent to the hydrocarbon. Preferably the heating step occurs after the addition of the asphaltene dispersing agent.

The hydrocarbon, suitably oil, preferably comprises at least 0.1%, particularly at least 1%, desirably at least 2%, especially at least 5% by weight of asphaltenes based on the total weight of the mixture. The hydrocarbon may comprise at most 40%, preferably at most 35%, particularly at most 30%, desirably at most 25%, especially at most 20% by weight of asphaltenes based on the total weight of the mixture. The hydrocarbon may comprise in the range from 2 to 30%, particularly 4 to 25%, and especially 5 to 20% by weight of asphaltenes based on the total weight of the mixture.

Formulations Including the Asphaltene Dispersing Agent

The asphaltene dispersing agent defined herein may be used in neat (undiluted) form, but is suitably added to, or applied to, the hydrocarbon in a diluent medium.

Viewed from one aspect, the invention may provide a formulated product such as a composition comprising a diluent medium and the asphaltene dispersing agent. The composition may comprise, consist essentially of, or consist of, the diluent medium and the asphaltene dispersing agent.

Preferably, the diluent medium is a non-aqueous solvent or fuel. The diluent medium may comprise, consist essentially of, or consist of, one or more mineral oils, more preferably one or more paraffinic oils. In an embodiment, the diluent medium is not an aromatic oil or solvent. The diluent medium comprises preferably less than 10% by weight, more preferably less than 5% by weight, particularly less than 1% by weight of aromatic materials, and especially substantially no aromatic materials.

The diluent medium may comprise a paraffinic solvent, particularly a paraffinic and napthenic solvent. The diluent medium may be an iso-paraffinic solvent. A suitable solvent may be selected from the LPA™ range available from Sasol, particularly LPA-170.

Preferably, the diluent medium comprises an ester. The ester may be an alkyl ester, preferably a C1 to C4 alkyl ester, particularly a methyl or ethyl ester. The ester may be a fatty acid ester, preferably a soyate ester. Preferably the ester comprises methyl soyate. The ester may be present in a fuel, for example a biodiesel. Desirably, the diluent medium is a biodiesel.

The concentration of the asphaltene dispersing agent in the diluent medium is suitably in the range from 10 to 90%, preferably 20 to 80%, more preferably 30 to 70%, particularly 40 to 60%, and especially 45 to 55% by weight based on the total weight of the composition.

The composition comprising diluent medium and asphaltene dispersing agent is suitably added to the hydrocarbon, preferably crude oil, at a dosage rate in the range from 5 to 5,000 ppm, preferably 20 to 1,000 ppm, more preferably 30 to 300 ppm, particularly 40 to 200 ppm, and especially 50 to 100 ppm by weight based on the total weight of the mixture.

The concentration of the asphaltene dispersing agent present in the hydrocarbon, preferably oil, is suitably in the range from 5 to 1,000 ppm, preferably 10 to 200 ppm, more preferably 15 to 150 ppm, particularly 20 to 100 ppm by weight based on the total weight of the mixture.

Performance of the Asphaltene Dispersing Agent

The asphaltene dispersing agent (or ester) described herein surprisingly has an improved asphaltene dispersing value (or ADV). The asphaltene dispersing value may be measured as described herein.

The asphaltene dispersing agent may have an asphaltene dispersing value in the hydrocarbon, preferably crude oil (measured as described herein) at a concentration of 50 ppm by weight based on the total weight of the mixture, of at least 60%, preferably at least 70%, more preferably at least 80%, particularly at least 90%.

The asphaltene dispersing agent may have an asphaltene dispersing value in the hydrocarbon, preferably crude oil (measured as described herein) at a concentration of 100 ppm by weight based on the total weight of the mixture, of at least 70%, preferably at least 80%, more preferably at least 90%.

The asphaltene dispersing agent may have an asphaltene dispersing value in the hydrocarbon, preferably crude oil (measured as described herein) at a concentration of 200 ppm by weight based on the total weight of the mixture, of at least 80%, preferably at least 90%, more preferably at least 95%.

EXAMPLES

It will be understood that all test procedures and physical parameters described herein have been determined at atmospheric pressure and room temperature (i.e. about 20° C.), unless otherwise stated herein, or unless otherwise stated in the referenced test methods and procedures. All parts and percentages are given by weight unless otherwise stated.

In this specification the following test methods have been used:

(i) Asphaltene Dispersancy

The asphaltene dispersancy test used in this specification is as follows. The separation of asphaltene from crude oil was measured using a Turbiscan method based on ASTM D7061-06 but measured at 880 nm instead of 850 nm; at a 0.1 mm step instead of a 0.04 mm step; and at 30° C. instead of at room temperature. The tests were run on a Turbiscan instrument (supplied by Formulaction Inc.) which measured the percent of light transmitted through the sample from 10 mm to 50 mm height on the sample bottle at 1 minute intervals. Measurements were taken every minute, from 0 to 15 minutes (a total of 16 data points). The data recorded was the average transmittance from 10 mm to 50 mm height on the sample.

As defined in ASTM D7061-06, the separability number is the average value of the recorded data points for a single run. The separability numbers for different runs were not directly compared to each other because of any variance in the samples (which were run over many days).

The percent of asphaltene dispersed (referred to herein as the asphaltene dispersing value or ADV) was calculated using the formula;

Percent of Asphaltene Dispersed=[(Blank Separability Number−Dispersant Separability Number)/(Blank Separability Number)]×100

This value takes into account any slight variance in the blank for every set of runs. A new blank sample was measured daily.

The dispersant concentration in the sample was measured in ppm by weight based on the total weight of the sample.

(ii) Acid Value, Hydroxyl Value, Saponification Value

The acid value, hydroxyl value, saponification value and iodine value of the reaction product were measured using standard titration methods commonly used in the industry as follows:

The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

The acid value is defined as the number of mg of potassium hydroxide required to neutralise the free acids in 1 g of sample, and was measured by direct titration with a standard potassium hydroxide solution.

The saponification (or SAP) value is defined as the number of mg of potassium hydroxide required for the complete saponification of 1 g of sample, and was measured by saponification with a standard potassium hydroxide solution, followed by titration with a standard hydrochloric acid solution.

The iodine value is defined as the number of grams of iodine absorbed per 100 grams of sample. The reaction is carried out in the presence of chlorine in the form of a solution of iodine monochloride in glacial acetic acid. The unreacted iodine is then titrated with sodium thiosulfate solution.

The invention is illustrated by the following non-limiting examples.

Example 1

Into a 1-liter 4-neck round-bottom flask were charged with (1) 158 grams of sucrose (ex. United Sugars Corporation, co-milled with potassium stearate at 14.5 wt %), (2) 450 grams of partially hydrogenated methyl soyate (CE-1618 with iodine value of 60.4, ex. P&G Chemical), and (3) 2.5 grams of potassium carbonate (K2CO3). The molar ratio of sucrose to methyl soyate was 1 to 4. They were mixed by agitation, and heated to 135° C. slowly and gently. Once the reaction temperature reached 135° C., nitrogen sparge and vacuum were applied gradually to remove methanol, the by-product from trans-esterification, from the reactor. The reaction was kept at 135° C. and vacuum as low as 6 torr for 7 hours.

The crude product was filtered at 80-90° C., and a liquid reaction product was collected. The hydroxyl number for the reaction product was 144 mg KOH/g; saponification number was 160 mg KOH/g; acid number was 0.9 mg KOH/g; and iodine number was 51.4 g/100 g. The HLB value of the reaction product was calculate by Griffin's method to be about 5.

Example 2

Into a 2-liter 4-neck round-bottom flask were charged with (1) 334 grams of sucrose (ex. United Sugars Corporation, co-milled with potassium stearate at 14.5 wt %), (2) 980 grams of methyl soyate (iodine value of 131, ex. Cargill), and (3) 5.6 grams of potassium carbonate (K2CO3). The molar ratio of sucrose to methyl soyate was 1 to 4. They were mixed by agitation, and heated to 135° C. slowly and gently. Once the reaction temperature reached 135° C., vacuum and nitrogen sparge were applied gradually to remove methanol, the by-product from trans-esterification, from the reactor. The reaction was kept at 135° C. and vacuum as low as 20 torr for 22 hours.

The crude product was filtered at 80-90° C., and a liquid reaction product was collected. The hydroxyl number for this reaction product was 165 mgKOH/g; saponification number was 152 mgKOH/g; acid number was 1.6 mgKOH/g.

Example 3

Into a 1-liter 4-neck round-bottom flask were charged with (1) 167 grams of sucrose (ex. United Sugars Corporation, co-milled with potassium stearate at 14.5 wt %), (2) 490 grams of methyl soyate (ex. Cargill), and (3) 2.8 grams of potassium carbonate (K2CO3). The molar ratio of sucrose to methyl soyate was 1 to 4. They were mixed by agitation, and heated to 135° C. slowly and gently. Once the reaction temperature reached 135° C., vacuum was applied gradually to remove methanol, the by-product from trans-esterification, from the reactor. The reaction was kept at 135° C. and vacuum as low as 20 torr for 22 hours.

The crude product was filtered at 80-90° C., and a liquid reaction product was collected. The hydroxyl number for this reaction product was 168 mgKOH/g; saponification number was 152 mgKOH/g; acid number was 2.2 mgKOH/g.

Example 4

Into a 1-liter 4-neck round-bottom flask were charged with (1) 167 grams of sucrose (ex. United Sugars Corporation, co-milled with potassium stearate at 14.5 wt %), (2) 490 grams of methyl soyate (ex. Cargill), and (3) 2.8 grams of potassium carbonate (K2CO3). The molar ratio of sucrose to methyl soyate was 1 to 4.2. They were mixed by agitation, and heated to 135° C. slowly and gently. A nitrogen sparging was applied to remove methanol, the by-product from transesterification, from the reactor. The reaction was kept at 135° C. for 24 hours, and a nitrogen sparge was applied.

The crude product was filtered at 80-90° C., and a liquid reaction product was collected. The hydroxyl number for this reaction product was 128.4 mgKOH/g; saponification number was 158 mgKOH/g; acid number was 0.6 mgKOH/g. The iodine value was 109 g/100 g.

Example 5

Into a 1-liter 4-neck round-bottom flask were charged with (1) 180 grams of sucrose (ex. United Sugars Corporation, co-milled with potassium stearate at 14.5 wt %), (2) 404 grams of methyl laurate (98% pure, ex. P&G Chemicals), and (3) 2.8 grams of potassium carbonate (K2CO3). The molar ratio of sucrose to methyl soyate was 1 to 4.2. They were mixed by agitation, and heated to 135° C. slowly and gently. The reaction was kept at 135° C. for 24 hours. A nitrogen sparge was applied to remove methanol, the by-product, from the reaction.

The crude product was filtered at 80-90° C., and a liquid reaction product was collected. The hydroxyl number for this reaction product was 177 mgKOH/g, and saponification number was 207 mgKOH/g, and acid number was 0.4 mgKOH/g. The HLB of the reaction product was calculated by Griffin's method to be about 6.

Example 6

The reaction products of Examples 1 to 5 were subjected to the asphaltene dispersancy test described herein. Three different types of crude oil were used in the tests. The details of the crude oil types are given in Table 1.

TABLE 1

| Crude Oil Type | Source | Density (g/cm³ at 25° C.) | API Gravity | Water (wt %) | Asphaltene Content (wt %) |
|---|---|---|---|---|---|
| 1 | Canada | 0.97 | 15 | 29 | 6.7 |
| 2 | Canada | 0.99 | 11 | 19 | 11.9 |
| 3 | US | 0.80 | 45 | 0.04 | 1.7 |

The results of the asphaltene dispersancy test at concentrations of 50, 100 and 200 ppm of dispersant are given in Table 2. These results demonstrate the improved asphaltene dispersing properties of Examples 1 to 5 at 50 ppm and 200 ppm when compared with the comparative examples given in Example 7.

TABLE 2

| | | Asphaltene Dispersing Value (ADV) | | |
|---|---|---|---|---|
| Example Number | Crude Oil Type | 50 ppm Dispersant | 100 ppm Dispersant | 200 ppm Dispersant |
| 1 | 1 | 69.4% | 82.3% | 96.7% |
| 1 | 3 | 95.8% | 97.7% | 98.4% |

TABLE 2-continued

| | | Asphaltene Dispersing Value (ADV) | | |
|---|---|---|---|---|
| Example Number | Crude Oil Type | 50 ppm Dispersant | 100 ppm Dispersant | 200 ppm Dispersant |
| 2 | 1 | 99.7% | 99.8% | 99.8% |
| 2 | 2 | 61.2% | 90.7% | 96.7% |
| 3 | 1 | 99.3% | 100% | 99.8% |
| 3 | 2 | 88.1% | 94.2% | 99.6% |
| 4 | 1 | 99.1% | 99.9% | 99.9% |
| 4 | 2 | 81.8% | 96.1% | 97.2% |
| 5 | 1 | 95.8% | 99.2% | 100% |
| 5 | 2 | 73.7% | 86.1% | 95.9% |

Example 7—Comparative

This is a comparative example not according to the invention. Two existing commercially available asphaltene dispersants, namely dodecylbenzene sulphonic acid (DDBSA) and sorbitan mono-oleate (SMO) were used in the asphaltene dispersancy test described herein using Crude Oil Type 1. The results at concentrations of 50 ppm and 200 ppm of dispersant are given in Table 3.

TABLE 3

| Asphaltenes Dispersant | Asphaltene Dispersing Value (ADV) | |
|---|---|---|
| | 50 ppm Dispersant | 200 ppm Dispersant |
| DDBSA | 21.2% | 57.2% |
| SMO | 14.0% | 86.5% |

It is to be understood that the invention is not to be limited to the details of the above embodiments, which are described by way of example only. Many variations are possible.

The invention claimed is:

1. A method of dispersing asphaltenes to inhibit asphaltene precipitation and/or deposition in a hydrocarbon, the method comprising adding to the hydrocarbon an asphaltene dispersing agent which is an ester of a mono-carboxylic fatty acid and a sugar;
   wherein the sugar comprises at least 4 hydroxyl groups; and
   wherein more than one of the hydroxyl groups on the sugar are reacted with the mono-carboxylic fatty acid to form the ester.

2. A method according to claim 1 wherein at least one of the hydroxyl groups on the sugar remains unreacted in the ester.

3. A method according to claim 1 wherein on average, at most 75% of the hydroxyl groups on the sugar are reacted with the fatty acid to form the ester.

4. A method according to claim 1 wherein the sugar is a disaccharide.

5. A method according to claim 1 wherein the sugar is sucrose.

6. A method according to claim 1 wherein the fatty acid comprises at least 10 wt % polyunsaturated species.

7. A method according to claim 1 wherein the fatty acid is derived from soybean oil.

8. The method according to claim 1 wherein the ester has an asphaltene dispersing value of at least 60% at a concentration of 50 ppm in the hydrocarbon.

* * * * *